United States Patent [19]

Pressaco et al.

[11] Patent Number: 4,629,038
[45] Date of Patent: Dec. 16, 1986

[54] DISC BRAKE WITH AUTOMATIC ADJUSTMENT

[75] Inventors: Pierre Pressaco, La Courneuve; Jean-Paul Sauvee, Aubervilliers, both of France

[73] Assignee: Societe Anonyme D.B.A., Paris, France

[21] Appl. No.: 734,632

[22] Filed: May 15, 1985

[30] Foreign Application Priority Data

May 23, 1984 [FR] France .................. 84 08052

[51] Int. Cl.⁴ ........................... F16D 55/02
[52] U.S. Cl. ................ 188/71.9; 188/196 D
[58] Field of Search ............ 188/71.9, 71.8, 71.7, 188/310, 196 D

[56] References Cited

U.S. PATENT DOCUMENTS

| 3,732,952 | 5/1973 | Asquith | 188/196 D X |
| 4,056,173 | 11/1977 | Farr | 188/196 D X |
| 4,399,894 | 8/1983 | Tribe | 188/71.9 |
| 4,429,768 | 2/1984 | Margetts et al. | 188/71.9 |
| 4,553,643 | 11/1985 | Wilcox | 188/71.9 |

FOREIGN PATENT DOCUMENTS

| 2724129 | 11/1978 | Fed. Rep. of Germany . |
| 2909494 | 10/1979 | Fed. Rep. of Germany . |
| 1294718 | 4/1962 | France . |
| 1162630 | 8/1969 | United Kingdom ......... 188/310 |

Primary Examiner—Duane A. Reger
Assistant Examiner—Lawrence J. Goffney, Jr.
Attorney, Agent, or Firm—Larry J. Palguta; Ken C. Decker

[57] ABSTRACT

Disc brake with automatic adjustment incorporating a calliper (10) mounted so as to slide on a fixed support by way of at least one axial pillar, a brake actuator (34) acting directly upon a first friction component, and by reaction through the calliper, upon a second friction component, the brake actuator (34) incorporating a mechanical control (48-50-60) acting upon a hydraulic control piston (36) through an automatic adjustment device (66), the adjustment device (66) being formed by a screw and nut system (68-70), which has a pitch which allows reverse action, and is capable of being actuated by the hydraulic piston (36) beyond a predetermined travel of the latter, the adjustment device (66) incorporating a sleeve (104) firmly fixed in rotation to the nut (70) and cooperating with annular control piston (80) which is capable of moving so as to be sealed relative to the screw (68) and relative to the brake actuator (34), the control piston (80) immobilizing the sleeve (104) in rotation and in translation when the hydraulic pressure acting on the hydraulic control piston (36) reaches a predetermined value. The screw and nut system (68-70) is positioned between the mechanical control (48-50-60) and the control piston (80); in addition, the brake actuator (34) incorporates a device for resetting manually to zero (114), which is capable of acting upon the nut (70) of the screw and nut system (68-70) in order to reset the automatic adjustment device (66) to zero.

9 Claims, 4 Drawing Figures

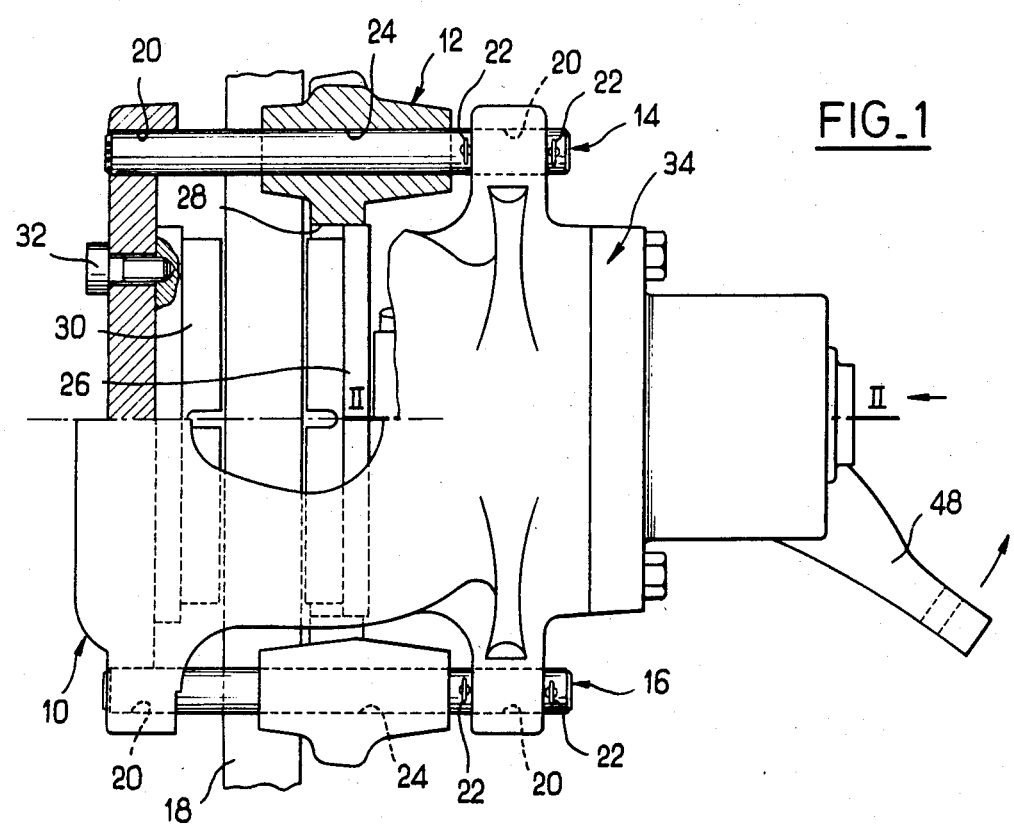
FIG_1
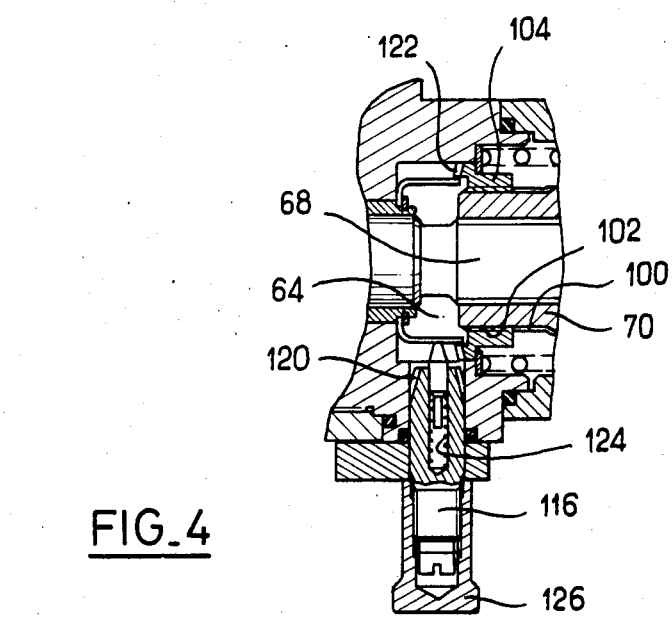
FIG_4

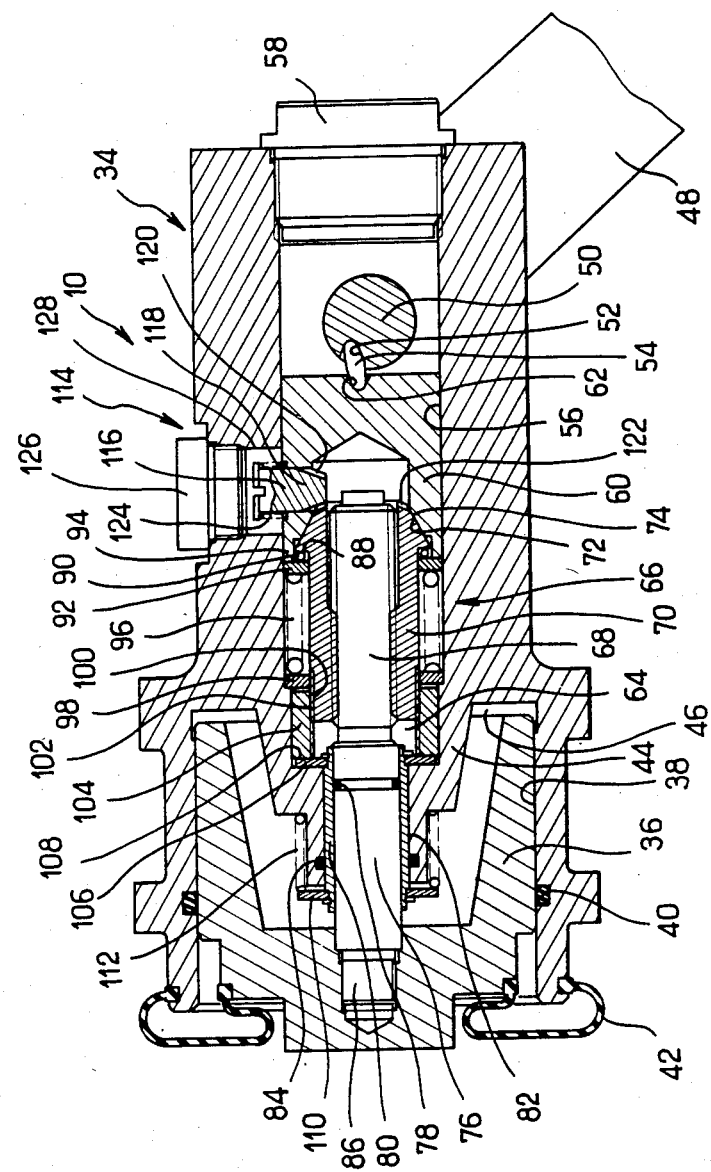
FIG_2

DISC BRAKE WITH AUTOMATIC ADJUSTMENT

The invention concerns a disc brake for a motor vehicle.

The invention particularly concerns a disc brake of the type with a sliding calliper incorporating a brake actuator capable of being actuated independently either by fluid pressure or by a mechanical control. Actuation of the brake actuator directly pushes a first friction component into frictional engagement with a first face of a rotating disc, and by reaction through the sliding calliper, a second friction component into frictional engagement with a second face of the disc opposite from the first surface. The calliper slides relative to a fixed support which carries directly or indirectly the torque generated by the friction components. In brakes of this type, taking into account the initial thickness of the friction components, it is necessary to have an automatic adjustment device positioned on the mechanical control so that the travel of this control does not increase as a function of the wear of the friction components. Numerous solutions have been proposed to resolve this problem. However, these systems generally possess the disadvantage of providing an adjustment irrespective of the reason which has caused the actuation of this automatic adjustment. This type of device operates not only to compensate for the wear of the friction components, which is normal, but also to compensate for the elastic deformations of the calliper for high pressures of the hydraulic control. This type of device necessitates a dead travel, which does not cause the automatic adjustment to occur, which is relatively large and is of the order of the deformation observed on the calliper during its actuation.

The Applicant company proposed a solution to this problem in French Patent Application No. 82/21,683 in which a disc brake of the above type is described in which the automatic adjustment is neutralized with the aid of an annular control piston when the hydraulic pressure acting upon the hydraulic control piston reaches a predetermined value.

While solving the problem of over-adjustment, the device described in the Patent Application mentioned above possesses the disadvantage of difficult resetting to zero of the automatic adjustment system, particularly when replacing the friction components. In fact, resetting to zero can be carried out either by rotation of the hydraulic control piston with the risk of damage to the seal 40 and to the protective cover 42, and this on condition that access is available to the piston, or by a device which is able to rotate the nut of the automatic adjustment, but this necessitates this device being subjected to the hydraulic pressure which is likely to be present in the hydraulic chamber of the brake with the disadvantages of having to ensure an additional seal on a safety component, with all the risks of incorrect remounting of this seal after operating this device for resetting to zero.

The aim of the invention is to propose a disc brake of the type described above in which these disadvantages are eliminated while possessing the advantages of the latter.

For this purpose the invention proposes a disc brake with automatic adjustment of the type incorporating a calliper mounted so as to slide on a fixed support by means of at least one axial pillar, a brake actuator acting directly upon a first friction component, and by reaction through the calliper, upon a second friction component, the brake actuator incorporating a mechanical control acting upon a hydraulic control piston through a device for automatic adjustment, the adjustment device being formed by a screw and nut system having a pitch which allows reverse action, capable of being actuated by the hydraulic piston beyond a predetermined travel of the latter, the adjustment device incorporating a sleeve which is firmly fixed in rotation to the nut and co-operates with an annular control piston capable of moving so as to be sealed relative to the screw and relative to the said brake actuator, the said control piston immobilizing the sleeve in rotation and in translation when the hydraulic pressure acting upon the hydraulic control piston reaches a predetermined value, characterized in that the screw and nut system is positioned between the mechanical control and the control piston and in that the brake actuator incorporates a device for manually resetting to zero which is capable of acting on the nut of the screw and nut system in order to reset the automatic adjustment device to zero.

It will be understood that owing to such a construction, the whole of the automatic adjustment device is situated outside the hydraulic control pressure chamber, with the exception of the annular control piston which penetrates partially into it, it is thus easy to adapt a device for resetting to zero onto the automatic adjustment device as the latter is not subject to the braking pressure. In this way any risks of incorrect mounting and any hydraulic leak due to the device for resetting to zero are avoided.

Other characteristics and advantages of the disc brake, the subject of the present invention, will emerge from the detailed description of two embodiments, with reference to the accompanying drawings in which:

FIG. 1 is a plan view of a disc brake constructed in accordance with the instructions of the present invention;

FIG. 2 is a partial enlarged section through the line II—II shown in FIG. 1;

FIG. 4 is a partial section through the line IV—IV shown in FIG. 3.

Figure 3:
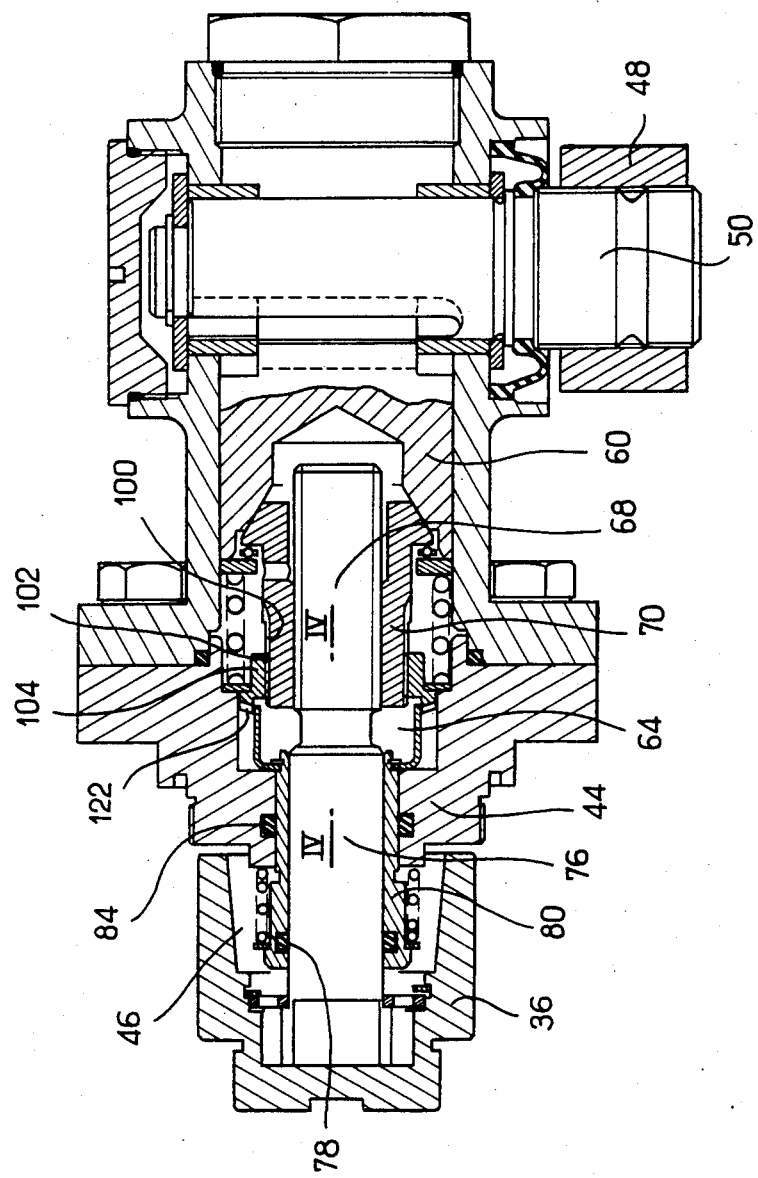
FIG. 3 is a view similar to that shown in FIG. 2 of the second embodiment of the invention.

The disc brake shown in FIGS. 1 and 2 incorporates a movable calliper 10 mounted so as to slide on a fixed component or support 12 by means of two pillars 14 and 16 lying parallel to the axis of rotation of the rotating disc 18. In the embodiment shown, and as is shown more particularly in FIG. 1, the axial pillars 14 and 16, firmly fixed to the calliper 10 by means of holes 20 and pins 22, passed through bores 24 formed in the fixed support 12 and are capable of sliding relative to these bores 24 and thus relative to the fixed support 12. A first friction component 26 is mounted in an opening 28 formed in the fixed support 12, this opening 28 enabling the friction component 26 to be anchored and to slide. A second friction component 30 is fixed to the calliper 10 by means of two screws 32 which anchor the friction component 30 onto the calliper 10. In addition, the calliper 10 is equipped with a brake actuator 34 incorporating hydraulic control and mechanical control as shown more precisely in FIG. 2. In a conventional manner, the hydraulic control is provided by a hydraulic control piston 36 mounted so as to slide in a bore 38 formed in the brake actuator 34. The seal between the piston 36 and the bore 38 is provided by a seal 40, the piston also being protected by a piston cover 42. The piston 36 and a bottom wall 44 of the bore 38 define a chamber 46 which is capable of being joined to a source of pressure (not shown) such as, for example, the master cylinder of the vehicle.

The mechanical control is provided by means of a lever 48 which is capable of being joined to a cable or a similar component (not shown) which is firmly fixed to a shaft 50 in which a groove 52 is formed so as to accept a rectangular link 54. The shaft 50 and the rectangular link 54 are housed in a blind bore 56 formed in the brake actuator 34, and the open portion of the bore is provided with a plug 58 which is threaded in the embodiment shown. The bore 56 also houses a plunger 60 whose end nearest the shaft 50 has a groove 62 which co-operates with the link 54. The plunger 60, the bore 56 and the wall 44 define an intermediate chamber 64 in which an automatic adjustment device is housed, designated as a whole by the reference 66. The automatic adjustment 66 incorporates a screw having a pitch which allows reverse action 68 on which a nut 70 is mounted, which carries at its opposite end from the wall 44 a conical portion 72, capable of co-operating with a conical portion 74 formed in the plunger 60. The screw 68 incorporates a cylindrical portion 76 in which a groove is formed, incorporating a seal 78. This seal 78 and the cylindrical portion 76 are capable of sliding relative to an annular piston 80 mounted in a bore 82 of the wall 44. A seal 84 is mounted in the bore 82 in such a manner as to seal any sliding of the piston 80 relative to the bore 82. The cylindrical portion 76 is extended in the direction of the piston 36 by a threaded portion 86 enabling the screw 68 to be firmly fixed to the control piston 36. In the region of the conical portion 72, the nut 70 carries a rolling track 88 facing the wall 44, and this rolling track 88 is capable of co-operating with an axial thrust ball bearing 90 position facing an annular component 92 forming a second rolling track, this component 92 is capable of sliding in the bore 56 of the brake actuator 34. This annullar component 92 is held against an extension 94 of the plunger 60 by means of a return spring 96 which itself bears against an annular portion 98 firmly fixed to the brake actuator 34. When the annular component 92 bears against the extension 94, and when the conical portion 72 bears against the conical portion 74, a clearance is provided between the thrust ball bearing 90 and the annular component 92 so as to define the operational clearance of the brake. The nut 70 carries on its end nearest the wall 44 and on the outside surface of the latter a number of grooves 100 in which projections 102 are mounted, formed on the inside surface of a sleeve 104, capable of sliding relative to the nut 70 but firmly fixed in rotation with the latter. The sleeve 104 is guided by its outside diameter in a portion of the bore 56, allowing this sleeve 104 to slide or to turn relative to the brake actuator 34. A collar 106 which is firmly fixed to the control piston 80 is positioned between the wall 44 and a front surface 108 of the sleeve 104. At rest, when the collar 106 bears against the wall 44, an axial clearance is provided between the sleeve 104 and the annular portion which is firmly fixed to the brake actuator 98. The control piston 80 carries at its end which enters the chamber 46 a portion which is opened out, or collar, which is firmly fixed to the piston 80 and against which a control spring 112 bears, the spring itself bearing against the wall 44.

The brake actuator 34 incorporates a device for resetting the automatic adjustment to zero, designated as a whole by the reference 114. This device 114 incorporates an operating rod 116, one end of which 118 carries a set of teeth 120 capable of co-operating with another set of teeth 122 carried by the adjacent end of the nut 70. The operating rod 116 carries an operating head at its other end, enabling the latter to be turned by means of a screw driver, for example. The operating head carries a collar against which a return spring 124 bears, the spring itself bearing against the plunger 60 in the region of an opening formed in the plunger 60 which allows guidance of the operating rod 116. A plug 126 screwed into the brake actuator 34 provides access, after being removed, to the operating rod 116. As the operating rod 116 is capable of moving with the plunger 60, a large axial clearance is provided between the operating rod 116 and the lateral walls of an opening 128 intended for access to the rod 116 and for mounting the plug 126.

Referring to FIGS. 3 and 4 which show a second embodiment, the same references are retained for components having the same functions.

In this embodiment, the only difference lies in the location of the device for resetting to zero, which in this embodiment co-operates not with the nut as in the first embodiment, but with the sleeve 104 which carries the other set of teeth 122 and allows rotation of the nut 70 through the grooves 100 and the projections 102. The remainder of the brake actuator is similar to the first embodiment and will not be described further.

As far as the operation of the brakes which are described above is concerned, reference will be made to the description which appears in the Patent Application filed by the Applicant Company and referenced above.

It will be observed, however, that owing to the seals 78 and 84, the intermediate chamber 64 is not subject to the hydraulic braking pressure which is likely to appear in the chamber 46, and that, consequently, the device for resetting to zero 114 is never subjected to the hydraulic braking pressure and does not require any special precaution.

The operation of the device for resetting to zero is carried out in the following manner: After having removed the plug 126 with the aid of a screwdriver, pressure is exerted on the operating rod 116 against the return spring 124 in such a way that the teeth 120 of the operating rod co-operate with the teeth 122 carried by the nut 70, in the first embodiment, and by the sleeve 104 in the second embodiment. Rotation of the screwdriver and thus of the operating rod drives directly, in the first embodiment, and through the sleeve 104 in the second embodiment, the nut 70 in rotation and thus allows relative movement between the screw 68 and the nut 70, which allows the resetting of the automatic adjustment to zero to be carried out and thus to bring back the piston 36 into its initial position.

As is clear from the above description, the device which is the subject of the invention enables a device for resetting the automatic adjustment to zero to be incorporated without the latter being subjected to the hydraulic braking pressure, thereby ensuring the reliability of the system and preventing any risk of incorrect mounting. In addition, the return spring of the operating rod ensures that the teeth are disengaged thus preventing interference with the normal operation of the automatic adjustment. Clearly, care will be taken to replace the plug 126 in order to protect the automatic adjustment from any external pollution.

It is clear that the invention is not limited to the embodiment described, in particular the two conical surfaces can be replaced by any other clutch without departing from the framework of the present invention; in the same way the operational clearance of the brake can be located in the region of the junction between the screw and the control piston, the thurst ball bearing 90 then being mounted without clearance relative to its rolling tracks, and the extension 94 of the plunger becoming unnecessary.

We claim:

1. A disc brake with automatic adjustment of the type incorporating a caliper mounted to slide on a fixed support by means of at least one axial pillar, a brake actuator acting directly upon a first friction component and by reaction through the caliper upon a second friction component, the brake actuator including a mechanical control acting upon a hydraulic piston through an automatic adjustment device, the adjustment device formed by a screw-and-nut system having a pitch allowing reverse action and which is capable of being actuated by the hydraulic piston beyond a predetermined travel of the hydraulic piston, the adjustment device including a sleeve fixed firmly in rotation to the nut and cooperating with an annular control piston capable of moving in sealed manner relative to the screw and relative to the brake actuator, the control piston immobilizing the sleeve in rotation and in translation when hydraulic pressure acting upon the hydraulic piston reaches a predetermined pressure, characterized in that the screw-and-nut system is positioned between the mechanical control and the control piston and the brake actuator includes a device for manually resetting to zero which is capable of acting upon the nut of the screw-and-nut system in order to reset the automatic adjustment device to zero, the control piston separating in sealed manner a control chamber, into which the hydraulic pressure is admitted, from an intermediate chamber in which the screw-and-nut system is housed.

2. The disc brake according to claim 1, characterized in that the sleeve has at least one front surface at one of its ends capable of axially engaging a front collar portion carried by the control piston.

3. The disc brake according to claim 2, characterized in that the sleeve is capable of being immobilized in translation and in rotation by being trapped between the control piston and an annular portion fixed firmly to the brake actuator, when the predetermined pressure is reached.

4. The disc brake according to claim 3, characterized in that the nut is held in a first position by means of a return spring when the mechanical control is not being actuated, the nut being capable of moving against the spring during actuation of the mechanical control, the nut including a conical portion capable of co-operating with another conical portion carried by the mechanical control to provide a mutual fit and including a rolling track for an axial thrust ball bearing mounted between the rolling track and a second rolling track formed by an annular component, the annular component capable of sliding relative to the brake actuator and against the return spring when a relative movement between the nut and brake actuator occurs and is greater than a predetermined axial clearance, and the screw is fixed firmly to the hydraulic piston.

5. The disc brake according to claim 2, characterized in that the control piston is pushed axially toward the hydraulic piston by a control spring bearing upon the brake actuator, to allow possible rotation of the sleeve when the predetermined pressure has not been reached.

6. A disc brake with automatic adjustment of the type incorporating a caliper mounted to slide on a fixed support by means of at least one axial pillar, a brake actuator acting directly upon a first friction component and by reaction through the caliper upon a second friction component, the brake actuator including a mechanical control acting upon a hydraulic piston through an automatic adjustment device, the adjustment device formed by a screw-and-nut system having a pitch allowing reverse action and which is capable of being actuated by the hydraulic piston beyond a predetermined travel of the hydraulic piston, the adjustment device including a sleeve fixed firmly in rotation to the nut and cooperating with an annular control piston capable of moving in sealed manner relative to the screw and relative to the brake actuator, the control piston immobilizing the sleeve in rotation and in translation when hydraulic pressure acting upon the hydraulic piston reaches a predetermined pressure, characterized in that the screw-and-nut system is positioned between the mechanical control and the control piston and the brake actuator includes a device for manually resetting to zero which is capable of acting upon the nut of the screw-and-nut system in order to reset the automatic adjustment device to zero, the device for resetting to zero including a set of teeth carried by an operating rod and biased by a return spring, the teeth capable of being engaged by another set of teeth carried by the nut, resetting to zero being carried out by manual rotation of the operating rod and engaged nut.

7. A disc brake with automatic adjustment of the type incorporating a caliper mounted to slide on a fixed support by means of at least one axial pillar, a brake actuator acting directly upon a first friction component and by reaction through the caliper upon a second friction component, the brake actuator including a mechanical control acting upon a hydraulic piston through an automatic adjustment device, the adjustment device formed by a screw-and-nut system having a pitch allowing reverse action and which is capable of being actuated by the hydraulic piston beyond a predetermined travel of the hydraulic piston, the adjustment device including a sleeve fixed firmly in rotation to the nut and cooperating with an annular control piston capable of moving in sealed manner relative to the screw and relative to the brake actuator, the control piston immobilizing the sleeve in rotation and in translation when hydraulic pressure acting upon the hydraulic piston reaches a predetermined pressure, characterized in that the screw-and-nut system is positioned between the mechanical control and the control piston and the brake actuator includes a device for manually resetting to zero which is capable of acting upon the nut of the screw-and-nut system in order to reset the automatic adjustment device to zero, the device for resetting to zero including a set of teeth carried by an operating rod and biased by a return spring, the teeth capable of being engaged by another set of teeth carried by the sleeve, resetting to zero being carried out by manual rotation of the operating rod and nut engaged via the sleeve.

8. The disc brake according to claim 7, characterized in that the operating rod is partially housed in an intermediate chamber free of any hydraulic pressure, and a plug mounted on the brake actuator that provides access, after removal thereof, to the operating rod.

9. The disc brake according to claim 8, characterized in that the operating rod extends perpendicularly to an axis of the brake actuator.

* * * * *